(12) United States Patent
Gomes-Augusto et al.

(10) Patent No.: US 11,056,080 B2
(45) Date of Patent: Jul. 6, 2021

(54) ELECTRONIC DEVICE AND METHOD FOR MANAGING THE DISPLAY OF DATA FOR CONTROLLING A NUCLEAR POWER PLANT, ASSOCIATED CONTROL SYSTEM AND COMPUTER PROGRAM PRODUCT

(71) Applicant: FRAMATOME, Courbevoie (FR)

(72) Inventors: Silvia Gomes-Augusto, La Varenne (FR); Philippe Hilsenkopf, Chelles (FR); Pierre Bazot, L'Etang la Ville (FR)

(73) Assignee: FRAMATOME, Courbevoie (FR)

( * ) Notice: Subject to any disclaimer, the term of this patent is extended or adjusted under 35 U.S.C. 154(b) by 249 days.

(21) Appl. No.: 16/061,626

(22) PCT Filed: Dec. 15, 2016

(86) PCT No.: PCT/EP2016/081291
§ 371 (c)(1),
(2) Date: Jun. 12, 2018

(87) PCT Pub. No.: WO2017/103006
PCT Pub. Date: Jun. 22, 2017

(65) Prior Publication Data
US 2020/0265802 A1  Aug. 20, 2020

(30) Foreign Application Priority Data
Dec. 15, 2015 (FR) ...................... 1562432

(51) Int. Cl.
*G09G 5/14* (2006.01)
*G21C 7/36* (2006.01)
(Continued)

(52) U.S. Cl.
CPC ................. *G09G 5/14* (2013.01); *G21C 7/36* (2013.01); *G21D 3/008* (2013.01);
(Continued)

(58) Field of Classification Search
CPC ......... G21D 3/04; G21D 3/00; G05B 23/0272
See application file for complete search history.

(56) References Cited

U.S. PATENT DOCUMENTS 4,585,609 A * 4/1986 Le Rat .................... G21D 3/04
376/217
4,675,147 A * 6/1987 Schaefer ................. G21D 3/04
345/440
(Continued)

FOREIGN PATENT DOCUMENTS

CN    101699395 A    4/2010
CN    102496246 A    6/2012
(Continued)

OTHER PUBLICATIONS

Corresponding Search Report for PCT/ EP2016/081291.

*Primary Examiner* — Bernarr E Gregory
(74) *Attorney, Agent, or Firm* — Davidson, Davidson & Kappel, LLC

(57) ABSTRACT

An electronic device (18) is for managing the display of data to control a nuclear power plant. The data comes from a plurality of electronic control units (16A, 16B, 16C). Each control unit is configured to perform at least one action from among acquiring a value measured by a sensor (12A, 12B, 12C) and controlling an actuator (14A, 14B, 14C), the control units, sensor(s) and/or actuator(s) being according to several different nuclear safety classes. This electronic device (18) is able to be connected to the control units, and includes a set (25) of electronic module(s) (26A, 26B, 26C) for creating overlay(s) (28A, 28B, 28C). Each overlay contains information associated with one or several control units and according to a respective safety class; and a module (30) for generating a page (32) to be displayed, by superposition of several separate overlays.

11 Claims, 3 Drawing Sheets

(51) Int. Cl.
   *G21D 3/00*      (2006.01)
   *G06F 3/14*      (2006.01)
   *G21C 7/00*      (2006.01)

(52) U.S. Cl.
   CPC ..... *G09G 2340/10* (2013.01); *G09G 2340/12* (2013.01); *G09G 2358/00* (2013.01)

(56) References Cited

U.S. PATENT DOCUMENTS

| | | | | |
|---|---|---|---|---|
| 4,815,014 | A | * | 3/1989 | Lipner ............... G21D 3/04 702/184 |
| 4,957,690 | A | * | 9/1990 | Fennern ............. G21D 3/008 376/216 |
| 5,068,080 | A | * | 11/1991 | Impink, Jr. ........ G05B 23/0272 376/215 |
| 5,089,978 | A | * | 2/1992 | Lipner ............... G21D 3/04 702/183 |
| 5,267,277 | A | * | 11/1993 | Scarola .............. G21D 3/008 376/216 |
| 5,353,315 | A | * | 10/1994 | Scarola .............. G21D 3/008 376/259 |
| 5,559,691 | A | * | 9/1996 | Monta ............... G21D 3/00 700/83 |
| 5,812,622 | A | * | 9/1998 | Chang ............... G21D 3/00 376/259 |
| 5,818,892 | A | * | 10/1998 | Rauch ............... G21C 7/36 376/215 |
| 5,859,885 | A | * | 1/1999 | Rusnica ............ G21D 3/04 340/525 |
| 6,774,786 | B1 | | 8/2004 | Havekost et al. |
| 9,275,764 | B2 | * | 3/2016 | Hanada ............. G21D 3/008 |
| 2007/0101290 | A1 | | 5/2007 | Nakashima et al. |
| 2007/0216700 | A1 | | 9/2007 | Chen et al. |
| 2008/0205693 | A1 | | 8/2008 | Kitamura et al. |
| 2012/0050320 | A1 | | 3/2012 | Verbeque et al. |
| 2013/0083878 | A1 | | 4/2013 | Massie et al. |

FOREIGN PATENT DOCUMENTS

| | | |
|---|---|---|
| EP | 2843626 A2 | 3/2015 |
| GB | 2329542 A | 3/1999 |
| JP | H063482 A | 1/1994 |
| RU | 2014117676 A | 11/2015 |

* cited by examiner

ELECTRONIC DEVICE AND METHOD FOR MANAGING THE DISPLAY OF DATA FOR CONTROLLING A NUCLEAR POWER PLANT, ASSOCIATED CONTROL SYSTEM AND COMPUTER PROGRAM PRODUCT

The present invention relates to a device for managing the display of data on at least one display screen, for controlling a nuclear power plant including at least one nuclear reactor.

The invention also relates to a system for controlling the nuclear power plant. The system comprises a set of sensors and actuators associated with the nuclear reactor(s), a plurality of electronic control units, each control unit being configured to perform at least one action from among acquiring a value measured by a corresponding sensor and controlling a corresponding actuator; and such an electronic device, the data being associated with the control units, the electronic device being connected to the plurality of control units. The control units and the sensor(s) and/or actuator(s) are according to several different nuclear safety classes.

The invention also relates to a method for managing the data display, implemented by such an electronic device.

The invention also relates to a computer program product including software instructions which, when implemented by a computer, implement such a display management method.

BACKGROUND

Document U.S. Pat. No. 8,259,990 B2 describes a system for controlling a nuclear power plant, including secure equipment and non-secure equipment. Each piece of secure equipment is a piece of equipment capable of performing a function making it possible to stop a nuclear reactor immediately, and each piece of nonsecure equipment is a piece of equipment making it possible to perform normal starts/stops, and to monitor and/or control operations.

The control system comprises a device for managing the display of data associated with the secure and non-secure equipment, the data associated with the different pieces of equipment being, during the display, superimposed on one another to obtain the displayed pages.

However, with such a control system, the management of the display of the data associated with the secure equipment is not optimal.

SUMMARY OF THE INVENTION

An aim of the present disclosure is therefore to provide an electronic device and a method for managing the display of data making it possible to improve the management of the safety of the data for the control of a nuclear power plant.

To that end, an electronic device for managing the display of data on at least one display screen to control a nuclear power plant including at least one nuclear reactor is provided, the data coming from a plurality of electronic control units, each control unit being configured to perform at least one action from among acquiring a value measured by a sensor and controlling an actuator, the sensor(s) and/or actuator(s) being associated with the nuclear reactor(s), the control units and/or the sensor(s) and/or actuator(s) being according to several different nuclear safety classes, the electronic device being able to be connected to the plurality of control units, and comprising:

a set of electronic module(s) for creating overlay(s), the assembly being configured to create several separate overlays, each overlay containing information to be displayed for a respective safety class, associated with one or several control units according to said safety class, and an electronic generating module configured to generate at least one data page to be displayed, each page being obtained by superimposing a plurality of separate overlays.

Thus, the module(s) for creating overlay(s) are configured to create several separate overlays, each overlay containing information to be displayed for a respective safety class, said information being associated with one or several control units according to said safety class.

Separating the information to be displayed via separate overlays from one safety class to the other then allows better management of the data safety to control the nuclear power plant, while avoiding mixing information between different safety classes.

According to other advantageous aspects of the invention, the electronic device comprises one or more of the following features, considered alone or according to all technically possible combinations:

the electronic device comprises at least one module for creating overlay(s) for each respective safety class, the overlay creation modules being separated from one safety class to the next;

the electronic device comprises a single generating module;

the generating module is according to the highest safety class from among the different safety classes;

the generating module is configured to generate each page by superimposing an overlay associated with a higher safety class on top of an overlay associated with a lower safety class, to favor the information from the higher safety class in case of conflict during the superposition of the overlays;

the created overlays are separated from one safety class to the next; and each nuclear safety class is a safety class according to a standard chosen from among the group consisting of: standard IEC 61513, standard IEC 61226, standard IAEA, the United States of America nuclear safety standard, the European nuclear safety standard, the French N4 nuclear safety standard, the Japanese nuclear safety standard, the Republic of Korea nuclear safety standard, the Russian nuclear safety standard, the Swiss nuclear safety standard and the British nuclear safety standard.

Further separating the creation of the overlays for different safety classes through independence of the associated creation modules allows better management of the manufacture of the screen pages containing information from electronic control units for different safety classes, and thus guarantees the display of information from the highest safety class.

When the management device comprises several separate creation modules, each one is configured to create a separate overlay.

A system for controlling a nuclear power plant including at least one nuclear reactor is also provided, the system comprising:

a set of sensors and actuators associated with the nuclear reactor(s);

a plurality of electronic control units, each control unit being configured to perform at least one action from among acquiring a value measured by a corresponding sensor and controlling an actuator, the control units and/or the sensor(s) and/or actuator(s) being according to several different nuclear safety classes; and an electronic device for managing the display of data on at least one display screen, the data being associated with the control units, the electronic device being connected to the plurality of control units, the electronic device being as defined above.

A method for managing the display of data on at least one display screen to control a nuclear power plant including at least one nuclear reactor is also provided, the data coming from a plurality of electronic control units, each control unit being configured to perform at least one action from among acquiring a value measured by a sensor and controlling an actuator, the sensor(s) and/or actuator(s) being associated with the nuclear reactor(s), the control units and/or the sensor(s) and/or actuator(s) being according to several different nuclear safety classes, the method being able to be carried out by an electronic device able to be connected to the plurality of control units, and comprising:

creating, for each page to be displayed on at least one display screen, of several separate overlays, each overlay containing information to be displayed for a respective safety class, associated with one or several control units according to said safety class, and generating at least one data page to be displayed, each page being obtained by superimposing a plurality of separate overlays.

According to other advantageous aspects of the invention, the display management method comprises one or more of the following features, considered alone or according to all technically possible combinations:

during the creation of the overlays, the created overlays are separated from one safety class to the next; and during generation of the page(s), an overlay associated with a higher safety class is superimposed on top of an overlay associated with a lower safety class, to favor the information from the higher safety class in case of conflict during the superposition of the overlays.

A computer program product is also provided comprising software set points which, when implemented by a computer, carry out a display management method as defined above.

BRIEF SUMMARY OF THE DRAWINGS

These features and advantages of the invention will appear upon reading the following description, provided solely as a non-limiting example, and done in reference to the appended drawings, in which.

DETAILED DESCRIPTION

Figure 1:
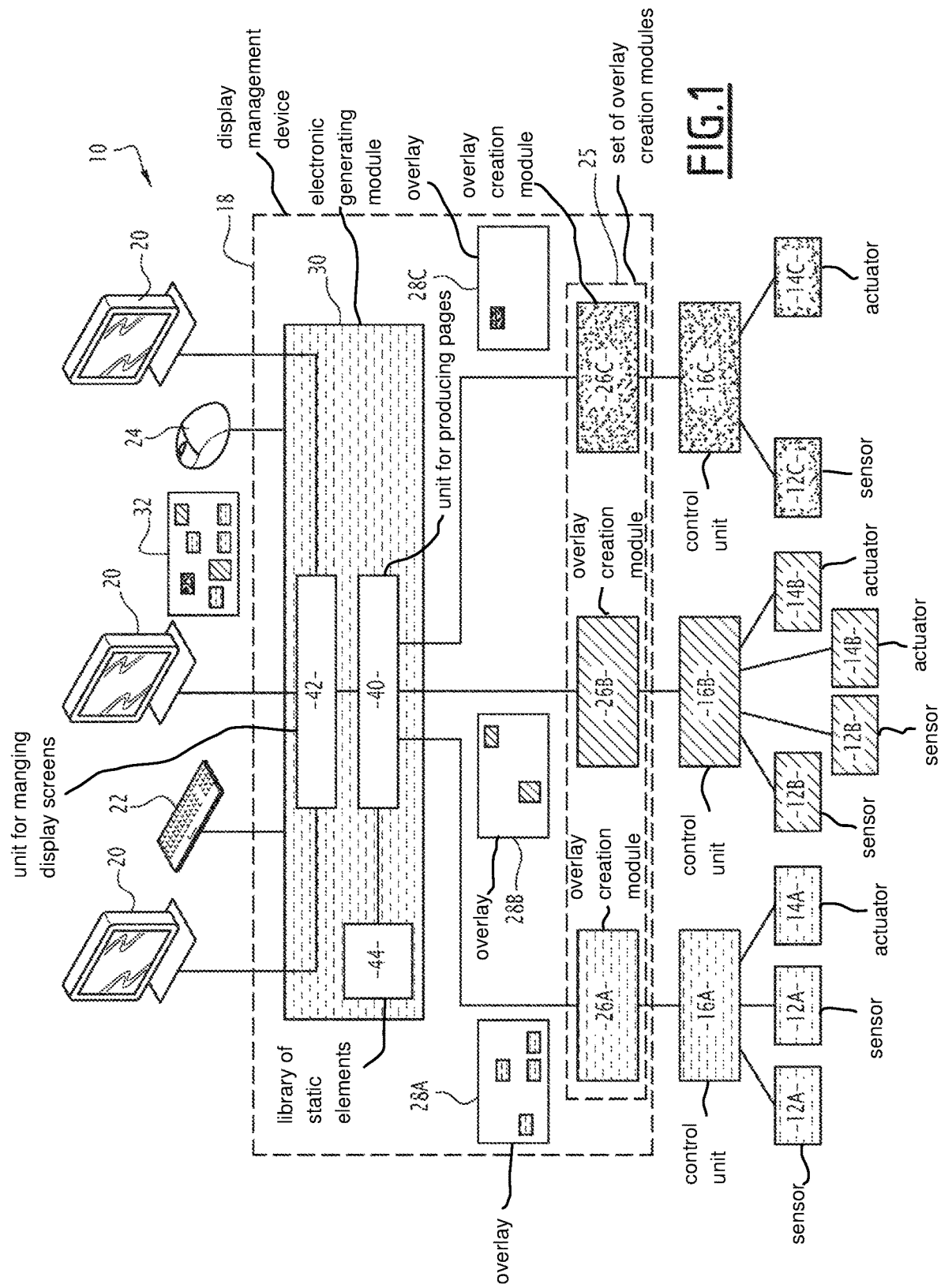
FIG. 1 is a schematic illustration of a system according to an embodiment of the invention for controlling a nuclear power plant, the system comprising a set of sensors and actuators, a plurality of electronic control units for the sensors and/or actuators, and an electronic device for managing the display of data on several display screens.

FIG. 1 shows a system 10 for controlling a nuclear power plant including at least one nuclear reactor, not shown.

The control system 10 comprises a set of sensors 12A, 12B, 12C and actuators 14A, 14B, 14C associated with the nuclear reactor(s).

The control system 10 comprises a plurality of electronic control units 16A, 16B, 16C, each control unit 16A, 16B, 16C being configured to perform at least one action from among acquiring a value measured by a corresponding sensor 12A, 12B, 12C and controlling a corresponding actuator 14A, 14B, 14C.

The control system 10 comprises an electronic device 18 for managing the display of data on at least one display screen 20, the data being associated with the control units, the electronic device 18 being connected to the plurality of control units 16A, 16B, 16C.

"Data associated with the control units" refers to data from the control units 16A, 16B, 16C and/or data sent to the control units 16A, 16B, 16C.

These data are for example measurements done by the sensors 12A, 12B, 12C, and then come from control units 16A, 16B, 16C; and/or control orders intended for actuators 14A, 14B, 14C, these data then first being sent to the control units 16A, 16B, 16C.

The control system 10 comprises, optionally and additionally, several interface modules with the user, such as one or several display screens 20, a keyboard 22 and a pointing device (mouse, trackball, touchscreen, etc.) 24, visible in FIG. 1. In the example of FIG. 1, the control system 10 comprises three display screens 20, and the display screens 20, the keyboard 22 and the pointing device 24 are connected directly to the management device 18.

The sensor(s) 12A, 12B, 12C and/or actuator(s) 14A, 14B, 14C and the control units 16A, 16B, 16C are in accordance with several separate nuclear safety classes, each in compliance with a respective nuclear safety class. As an illustration, each safety class is associated with a respective suffix letter 'A', 'C' for the references relative to the sensor(s) 12A, 12B, 12C, the actuator(s) 14A, 14B, 14C and the control units 16A, 16B, 16C.

In the example of FIG. 1, the sensor(s) 12A, 12B, 12C and/or actuator(s) 14A, 14B, 14C and the control units 16A, 16B, 16C are according to three separate safety classes, the suffix letter 'A' corresponding by convention to the highest safety class, the suffix letter 'C' corresponding to the lowest safety class, and the suffix letter 'B' corresponding to the intermediate safety class.

Each safety class is associated with a degree of safety, and by definition the highest safety class is that having the highest degree of safety. By analogy, the lowest safety class is that having the lowest degree of safety.

Each nuclear safety class is, for example, a safety class according to a standard chosen from among the group consisting of: standard IEC 61513, standard IEC 61226, standard IAEA, the United States of America nuclear safety standard, the European nuclear safety standard, the French N4 nuclear safety standard, the Japanese nuclear safety standard, the Republic of Korea nuclear safety standard, the Russian nuclear safety standard, the Swiss nuclear safety standard and the British nuclear safety standard.

For example, a match table between these nuclear safety standards is provided in table 1 below.

TABLE 1

| Standard | Nuclear safety class | | | |
|---|---|---|---|---|
| USA | Class 1E, secure!, or safety-related | | Systems whose safety functions may be inhibited by a failure | Non-secure |
| | RISC-1, RISC-3 | | | RISC-2, RISC-4 |
| IAEA | Secure | | Safety-related | Not important for security |
| IEC 61226 | Category A | Category B | Category C | Unclassified |
| IEC 61513 | Class 1 | Class 2 | Class 3 | Unclassified |
| Europe | F1A | F1B | F2 | Unclassified |
| France N4 | 1E | 2E | IFC/NC | |
| Japan | PS1/MS1 | PS2/MS2 | PS3/MS3 | Non-secure |
| South Korea | IC-1 | IC-2 | IC-3 | Non-IC |
| Russia | Class 2 | | Class 3 | Class 4 |
| Switzerland | Category A | Category B | Category C | Not important for security |
| United Kingdom | Category 1 | | Category 2 | Unclassified |

Each nuclear safety class is preferably a safety class according to standard IEC61513. The highest safety class is then class 1, and the lowest safety class is class N, where N represents the number of classes involved. In other words, according to standard IEC 61513, class 1 is that having the highest degree of safety, and class N is that having the lowest degree of safety.

The sensor(s) 12A, 12B, 12C and/or actuator(s) 14A, 14B, 14C and the control units 16A, 16B, 16C are known in themselves, to control the nuclear power plant. The sensor(s) 12A, 12B, 12C are for example sensors for measuring a temperature, pressure, flow rate, quantity of liquid in a reservoir, position. The actuator(s) 14A, 14B, 14C are for example pumps, valves, electrical circuit breakers.

The management device 18 is configured to manage the display of data associated with the control units 16A, 16B, 16C.

As an optional addition, the management device 18 is further configured to manage commands or actions from one or several operators, these commands or actions corresponding to entries made by the operator(s) using interface modules, such as the keyboard 22 and the pointing device 24. These commands or actions are for example intended for the control units 16A, 16B, 16C to command the actuators 14A, 14B, 14C. Alternatively or additionally, these actions are intended to navigate between data display pages or to enter requests.

The management device 18 comprises a set 25 of electronic module(s) 26A, 26B, 26C for creating overlay(s) 28A, 28B, 28C, the set 25 being configured to create several distinct overlays 28A, 28B, 28C, each overlay 28A, 28B, 28C containing information to be displayed for a respective safety class, associated with one or several control units 16A, 16B, 16C.

The management device 18 preferably comprises at least one module for creating overlay(s) 26A, 26B, 26C for each respective safety class. The modules for creating overlay(s) 26A, 26B, 26C are for example separated from one safety class to the next. If applicable, each safety class is associated with a respective suffix letter 'A', 'B', 'C' for the references 26A, 26B, 26C relative to the overlay creation modules, with the previously described convention, namely that the letter 'A' corresponds to the safest class, the letter 'C' corresponding to the least safe class and the letter 'B' corresponding to the class of intermediate safety.

The management device 18 comprises an electronic generating module 30 configured to generate at least one data page 32 to be displayed, each page 32 being obtained by superimposing a plurality of separate overlays 28A, 28B, 28C.

The management device 18 preferably comprises a single generating module 30. The generating module 30 is then preferably according to the highest safety class from among the different safety classes.

Figure 2:
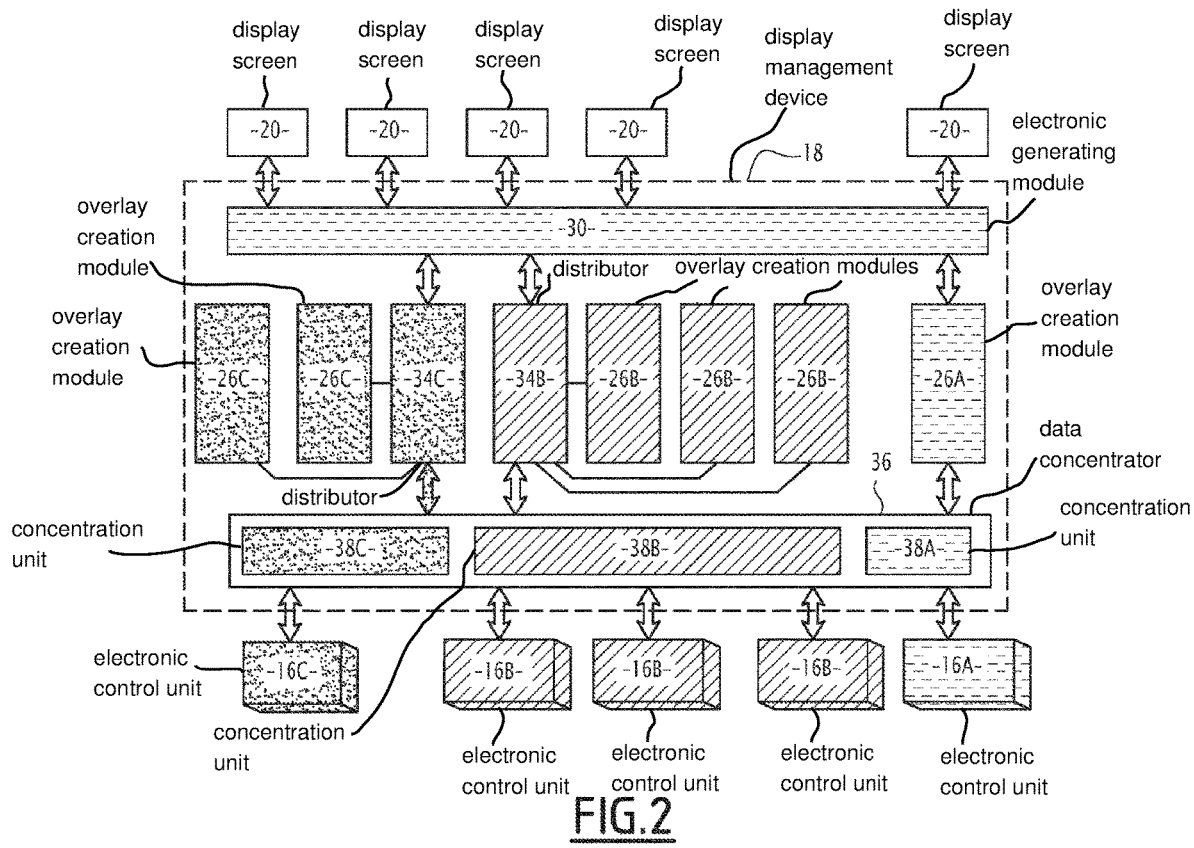
FIG. 2 is a schematic illustration of the control system according to one alternative embodiment.

As an optional addition, the management device 18 comprises one or several distributors 34B, 34C, each being connected to several overlay creation modules 26A, 25 26B, 26C and associated with a respective safety class, as shown in FIG. 2.

As a further optional addition, the management device 18 comprises a data concentrator 36 connected between, on the one hand, the control units 16A, 16B, 16C, and, on the other hand, the overlay creation modules 26A, 26B, 26C, in particular the distributors 34B, 34C if applicable. The data concentrator 36 includes one or several data 30 concentration units 38A, 38B, 38C, each data concentration unit 38A, 38B, 38C being connected to one or several control units 16A, 16B, 16C and associated with a respective safety class.

According to this optional addition and in the example of FIG. 2, the data concentrator 36 includes three data concentration units 38A, 38B, 38C, the data concentration unit 38A, associated with class 1 according to standard IEC 61513, being connected to a control unit 16A and the overlay creation module 26A, the data concentration unit 38B, associated with class 2 according to standard IEC 61513, being connected between three control units 16B and the distributor 34B, and the data concentration unit 38C, associated with class 3 according to standard IEC 61513, being connected between a single control unit 16C and the distributor 34C.

The management device 18 for example comprises one or several information processing unit(s) each formed by a processor and a memory associated with the processor, not shown. The overlay creation module(s) 26A, 26B, 26C and the generating module 30 are then for example made in the form of overlay creation software, and respectively generating software, these software programs being able to be stored in the memory and to be executed by the corresponding processor. As an optional addition, the distributors 34B, 34C are also made in the form of distributing software able to be stored in the memory and executed by the processor.

Alternatively, the overlay creation module(s) 26A, 26B, 26C and the generating module 30 are made in the form of programmable logic components, such as FPGA (Field-Programmable Gate Arrays), or in the form of dedicated integrated circuits, such as ASIC (Application-Specific Integrated Circuits).

Each overlay 28A, 28B, 28C is also called layer, and contains information specific to a given safety class. The created overlays 28A, 28B, 28C are separated from one safety class to the next. The overlays 28A, 28B, 28C are defined in the computer file format containing graphic objects. The overlays 28A, 28B, 28C make it possible to depict a dynamic state of the nuclear power plant and control the power plant through operator actions.

The generating module 30 is preferably configured to generate each page 32 by favoring the information for the highest safety class in case of conflict during the superposition of the overlays.

Figure 4:
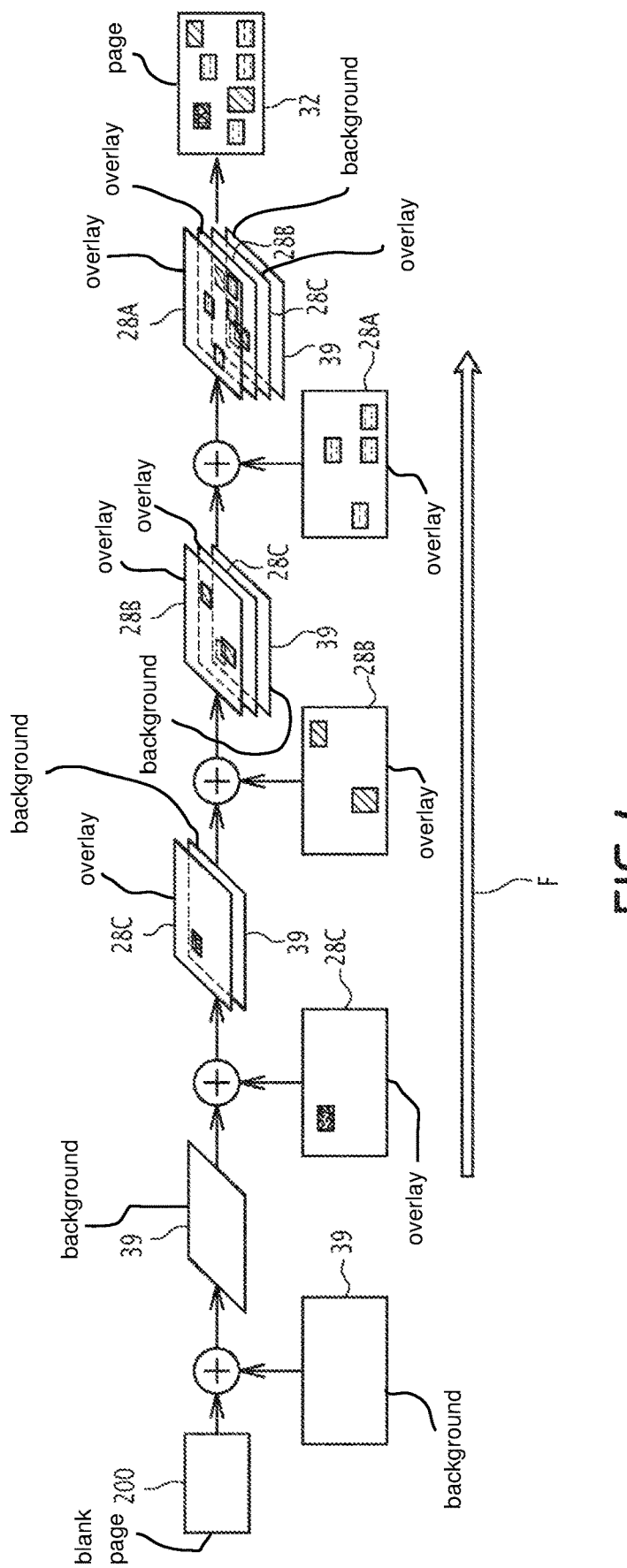
FIG. 4 is a diagram illustrating the superposition of several separate overlays to obtain a data page to be displayed.

The generating module 30 is then configured to superimpose an overlay 28A, 28B associated with a higher safety class on top of an overlay 28B, 28C associated with a lower safety class. In the example of FIG. 4, the overlay 28C is thus superimposed on a background 39, the overlay 28B is next superimposed on the result obtained by 30 superposition of the background 39 and the overlay 28C, and the overlay 28A is lastly superimposed on the result obtained by superposition of the background 39 and the overlays 28C, 28B.

In the example of FIG. 1, the generating module 30 includes a unit 40 for producing each page 32 from the overlay 28A, 28B, 28C provided by the set 25 of electronic module(s) 26A, 26B, 26C, a unit 42 for managing display screens 20, a unit, not shown, for managing entries made by an operator via the keypad 22 and the pointing device 24, and a library 44 of static elements representing the backgrounds 39 of the images. The library of static elements 44 for example includes symbols and/or icons to be displayed on the screen 20, in addition to information associated with the sensor(s) 12A, 12B, 12C and/or actuator(s) 14A, 14B, 14C.

Each distributor 34B, 34C is, for a respective safety class, configured to distribute the received information between different overlay(s) creation modules 26A, 26B, 26C, which then makes it possible to create, in parallel for different screens 20, several separate overlays 28A, 28B, 28C for a given safety class.

Each data concentration unit 38A, 38B, 38C forms a data gateway between, on the one hand, the control unit(s) 16A, 16B, 16C to which it is connected, and on the other hand, the overlay(s) creation modules 26A, 26B, 26C, in particular the distributors 34B, 34C if applicable, to which it is connected.

Figure 3:
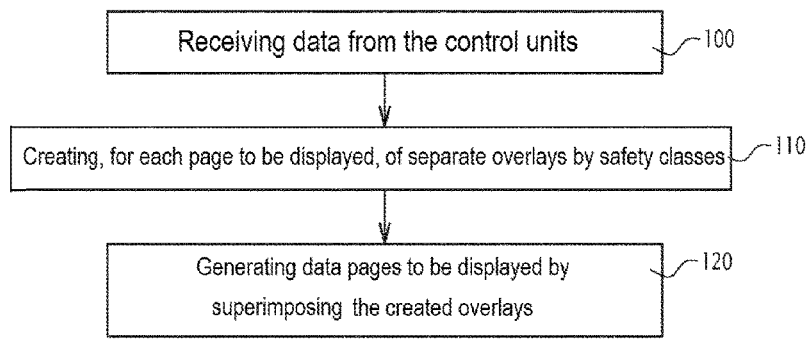
FIG. 3 is a flowchart of a method according to an embodiment of the invention for managing the display of data to control the nuclear power plant.

The operation of the management device 18 will now be explained using FIG. 3, showing a flowchart of the inventive method for managing the display of data to control the nuclear power plant.

During an initial step 100, the management device 18, in particular the set 25 of overlay(s) creation module(s) 26A, 26B, 26C, or even, if applicable, the distributors 34B, 34C, receives data intended to be displayed on the display screen(s) 20 by control units 16A, 16B, 16C, these data in turn being associated with the sensor(s) 12A, 12B, 12C and/or actuator(s) 14A, 14B, 14C.

During the following step 110, the set 25 of overlay(s) creation module(s) 26A, 26B, 26C creates, for each of the pages to be displayed on the screens 20, several separate overlays 28A, 28B, 28C, each overlay 28A, 28B, 28C containing information to be displayed for a respective safety class, this information having been received from the control unit(s) 16A, 16B, 16C according to said safety class.

When the overlays 28A, 28B, 28C are created 110, the created overlays 28A, 28B, 28C are preferably separated from one safety class to the next.

Preferably, the management device 18 comprises at least one module for creating overlay(s) 26A, 26B, 26C for each respective safety class, the overlay creation modules 26A, 26B, 26C being separated from one safety class to the next.

This then allows the separation of the information from different safety classes intended to be displayed. The data from a sensor 12A, 12B, 12C or actuator 14A, 14B, 14C according to a given safety class are first sent to a control unit 16A, 16B, 16C according to said given class, then to the overlay(s) creation module 26A, 26B, 26C according to said given class. In other words, the architecture of the control system 10 according to an embodiment of the invention in this case guarantees that the data pass from the sensor 12A, 12B, 12C or the actuator 14A, 14B, 14C to the overlay(s) creation module 26A, 26B, 26C through elements that all comply with the same given safety class, which then makes it possible to improve the management of the data safety.

The fact that the generating module 30 is compliant with the highest safety class from among the different safety classes then makes it possible to guarantee safe processing of the data even if the generating module 30 is the only one and connected to the set 25 of overlay(s) creation module(s) 26A, 26B, 26C. Indeed, the generating module 30 compliant with the highest safety class is compatible and able to communicate with an 10 overlay(s) creation module 26B, 26C according to a safety class having a lower degree of safety, while guaranteeing that this lower degree of safety will nevertheless be respected.

During the following step 120, the generating module 30 generates at least one data page 32 to be displayed, each page 32 being obtained by superimposing several separate overlays 28A, 28B, 28C.

When page(s) 32 are generated 120, an overlay 28A, 28B associated with a higher safety class is preferably superimposed on top of an overlay 28B, 28C associated with a lower safety class, as shown in FIG. 4.

This then makes it possible to favor the information from the higher safety class, relative to that of a lower safety class, in case of overlap during the superposition of the overlays.

In FIG. 4, the generating module 30 begins by generating a blank page 200, on which the background 39 is first superimposed, the background 39 for example coming from the library 44 and being stored in the memory, not shown, of the management device 18.

The generating module 30 next adds the overlay 28C corresponding to the lowest safety class, by superposition on top of the background 39, then adds the overlay 28B corresponding to the intermediate safety class by superposition on top of the overlay 28C previously added.

Lastly, the generating module 30 adds the overlay 28A corresponding to the highest safety class by superposition on top of the overlay 28B previously added, in order to ultimately obtain the page 32 to be displayed on the corresponding display screen(s) 20.

In other words, the separate overlays 28A, 28B, 28C are taken into account by increasing order of degree of safety of the safety class with which they are associated, this increasing order being represented by the arrow F visible in FIG. 4. Each overlay 28A, 28B, 28C is then superimposed on top of the overlay(s) 28B, 28C, or on top of the background 39, already taken into account.

One skilled in the art will understand that the information that is visible and displayed ultimately on the page 32 generated by the generating module 30 is the information contained in the overlay 28A corresponding to the safest safety class, as well as that contained in an overlay 28B, 28C corresponding to a lower safety class and not covered by information from an overlay 28A, 28B from a higher safety class.

One can then see that the electronic device 18 and the method for managing the display of data improve the management of the safety of the data in order to control the nuclear power plant, while making it possible to separate the information to be displayed by overlays 28A, 28B, 28C developed separately from one safety class to the next.

What is claimed is:

1. A system for controlling a nuclear power plant including at least one nuclear reactor, the system comprising:
    a set of sensors and actuators associated with the at least one nuclear reactor;

a plurality of electronic control units, each of the electronic control units being configured to perform at least one action from among acquiring a value measured by a corresponding sensor and controlling an actuator, the electronic control units and/or the at least one sensor and/or the at least one actuator being according to several different nuclear safety classes; and at least one information processing unit formed by a processor and a memory associated with the processor, the at least one information processing unit configured for managing the display of data on at least one display screen, the data being associated with the electronic control units, the at least one information processing unit being connected to the plurality of electronic control units, the at least one information processing unit comprising:

a set of overlay creation electronic modules for creating overlays, the set of overlay creation electronic modules being configured to create several separate overlays, each of the overlays containing information to be displayed for a respective one of the nuclear safety classes, associated with one or several of the electronic control units according to the nuclear safety class; and an electronic generating module configured to generate at least one data page to be displayed, each of the data pages being obtained by superimposing a plurality of the separate overlays.

2. The system according to claim 1, wherein the at least one information processing unit further comprises at least one module for creating the at least one overlay for each respective nuclear safety class, the overlay creation modules being separated from one nuclear safety class to the next.

3. The system according to claim 1, wherein the at least one information processing unit comprises a single electronic generating module, the electronic generating module being the single electronic generating module.

4. The system according to claim 1, wherein the electronic generating module is according to a highest nuclear safety class from among the different nuclear safety classes.

5. The system according to claim 1, wherein the overlays include an overlay associated with a higher nuclear safety class and an overlay associated with a lower nuclear safety class, the electronic generating module being configured to generate each of the pages by superimposing the overlay associated with the higher nuclear safety class on top of the overlay associated with the lower nuclear safety class, to favor the information from the higher nuclear safety class in case of conflict during the superposition of the overlays.

6. The system according to claim 1, wherein the created overlays are separated from one nuclear safety class to the next.

7. The system according to claim 1, wherein each nuclear safety class is a safety class according to a standard chosen from among the group consisting of: standard IEC 61513, standard IEC 61226, standard IAEA, the United States of America nuclear safety standard, the European nuclear safety standard, the French N4 nuclear safety standard, the Japanese nuclear safety standard, the nuclear safety standard of the Republic of Korea, the Russian nuclear safety standard, the Swiss nuclear safety standard and the British nuclear safety standard.

8. A method for managing the display of data on at least one display screen to control a nuclear power plant including at least one nuclear reactor, the data coming from a plurality of electronic control units, each of the electronic control units being configured to perform at least one action from among acquiring a value measured by a sensor and controlling an actuator, the at least one sensor and/or the at least one actuator being associated with the at least one nuclear reactor, the electronic control units and/or the at least one sensor and/or the at least one actuator being according to several different nuclear safety classes, the method being carried out by at least one information processing unit configured to be connected to the plurality of electronic control units, the at least one information processing unit being formed by a processor and a memory associated with the processor, the method comprising:

creating, for each page to be displayed on at least one display screen, several separate overlays, each of the overlays containing information to be displayed for a respective one of the nuclear safety classes, associated with one or several of the electronic control units according to the nuclear safety class, generating at least one data page to be displayed, each of the at least one pages being obtained by superimposing a plurality of the separate overlays, and displaying the at least one data page on the at least one display screen.

9. The method according to claim 8, wherein, during the creating of the overlays, the created overlays are separated from one nuclear safety class to the next.

10. The method according to claim 8, wherein the overlays include an overlay associated with a higher nuclear safety class and an overlay associated with a lower nuclear safety class, during the generating of the at least one page, the overlay associated with the higher nuclear safety class is superimposed on top of the overlay associated with the lower nuclear safety class, to favor the information from the higher nuclear safety class in case of conflict during the superposition of the overlays.

11. A non-transitory computer readable medium including instructions which, when executed by a computer, carry out all of the steps of the method according to claim 8.

* * * * *